United States Patent Office 3,132,802
Patented May 12, 1964

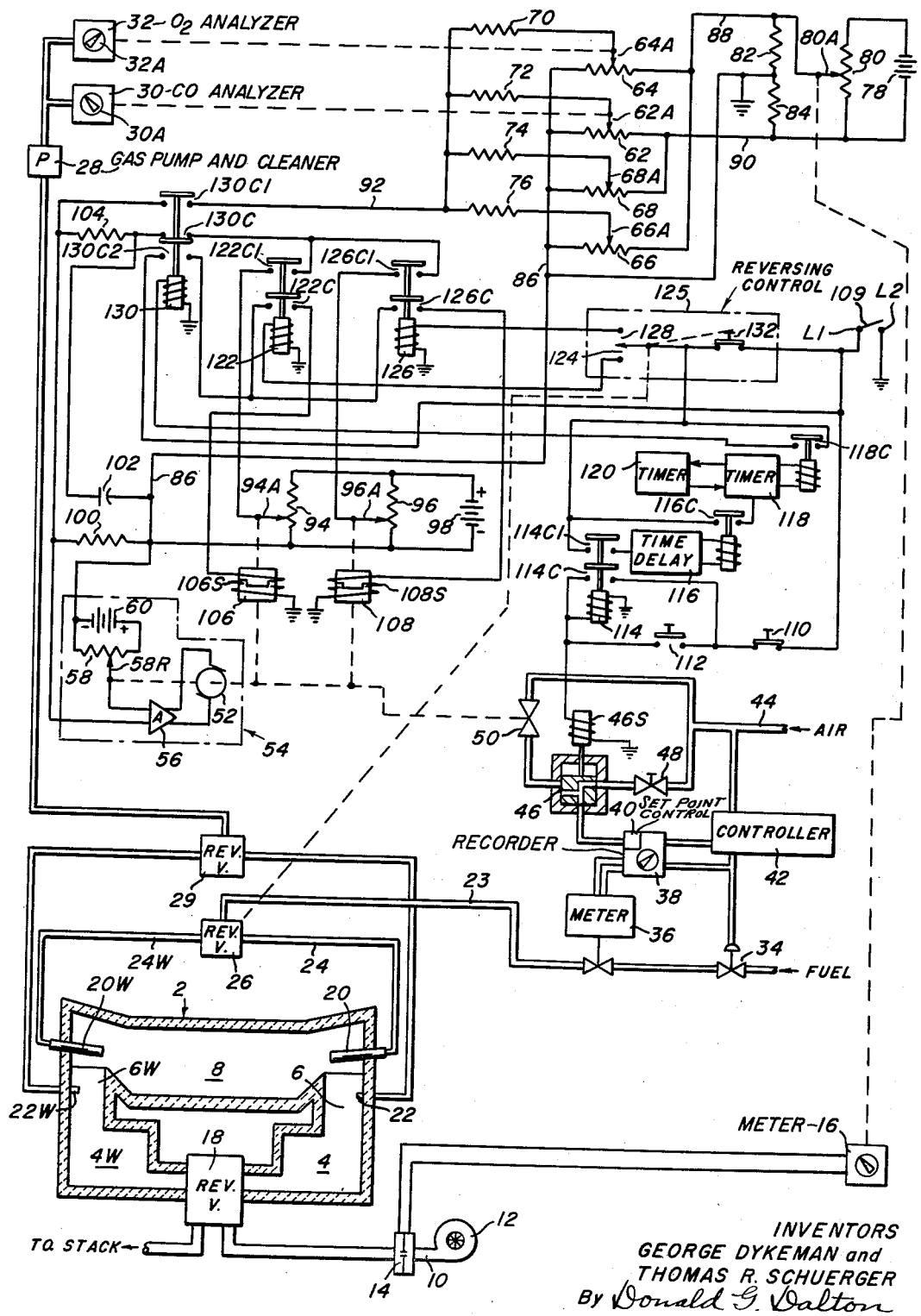

3,132,802
APPARATUS FOR CONTROLLING THE OPERA-
TION OF MULTIPLE COMBUSTION ZONES
George Dykeman, Pittsburgh, and Thomas R. Schuerger,
Pitcairn, Pa., assignors to United States Steel Corpora-
tion, a corporation of New Jersey
Filed June 12, 1961, Ser. No. 116,444
8 Claims. (Cl. 236—15)

This invention relates to apparatus for controlling the operation of multiple combustion zones and more particularly to controlling the operation of an open hearth furnace for making steel. Up to a comparatively recent time most open hearth furnace roofs were made of silica brick and experience indicated that from 1 to 2% excess oxygen should be supplied to obtain economical roof life, since a reducing atmosphere causes chemical changes in the silica brick which result in rapid wear and spalling. In recent years open hearth furnaces have been equipped with basic roofs and oxygen jets. Basic roofs are not subject to damage by oxidizing or reducing atmospheres, and the melting point of this brick is higher than any present open hearth flame temperature. While silica furnaces with silica brick roofs require reduced fuel rates as heat is accumulated in the bath and as roof temperatures increase, basic roofs have no such restrictions and high fuel rates can be maintained throughout the period of a heat regardless of whether a reducing or oxidizing atmosphere is present within the furnace. The use of oxygen jets creates large volumes of CO in the furnace at the point of injection, and it is quite common for this carbon monoxide not to burn prior to leaving the furnace. Therefore, in furnaces with oxygen lances it is quite common for the gases at the exit end of the furnace to contain both CO and $O_2$, whereas in furnaces without oxygen lances it is seldom that both $O_2$ and CO are contained in the gases at the gas sampling point. For the foregoing reasons it can be seen that in controlling furnaces having silica roofs and no oxygen lances, control of the fuel-air ratio should be based on the excess oxygen in the gases leaving the furnace. On the other hand, in furnaces having basic roofs and oxygen injections, control of the fuel-air ratio is preferably based upon both $O_2$ and CO in the gases leaving the furnace. In controlling the fuel-air ratio, either the fuel or air may be controlled. We prefer to control the fuel and hold the air flow constant. The reason for this is that the relationship between excess oxygen and excess CO vs. fuel changes is a linear relationship, where as the relationship between excess oxygen and excess CO vs. air changes is not a linear relationship. Assuming that liquid tar is being used as the fuel, the relationship can be expressed by the following equation:

I. $\Delta f = f - fo = 34a \, [\% O_2 - SP_{O_2} - \frac{1}{2}\% \, CO + \frac{1}{2} SP_{CO}]$ where $\Delta f$=change in fuel rate, $f$=the new fuel rate, $fo$ equals the old fuel rate in gallons per hr., $a$≡the air flow rate in millions of standard cubic ft. per hour, $SP_{O_2}$ is the set point of the oxygen and $SP_{CO}$ is the set point for the CO. When both $O_2$ and CO are present there is some indication that the set point should be slightly in the CO region to evolve the most heat in the furnace chamber. According to our invention, the control is arranged so that each of the terms in the above equation is obtained as a voltage, and the voltages are combined by the control. Continuous control of an open hearth furnace atmosphere requires continuous knowledge of the gas composition within the furnace chamber, and practical considerations require that the furnace atmosphere be sampled only as the gases leave the chamber and that fuel corrections be made only as the fuel enters the furnace chamber at the opposite end of the furnace.

There is an inherent delay between control action and the measurements of the result of that control action. Time is also required to sample and analyze the gases. Therefore, if gas samples are taken continuously and the controls operated continuously, there would be a great deal of hunting with every change in fuel rate or combustion. Since the open hearth reverses periodically and since the operation of one side of the furnace may vary somewhat from the operation of the other side of the furnace, it is desirable that the control be taken out of operation during reversal and that setting of the control for one end of the furnace be independent from the setting of the control for the other end of the furnace.

In controls commonly used in the operation of open hearth furnaces or other furnaces having more than one combustion zone it is normal to have duplicate equipment for each combustion zone. However, we have found that there is sufficient time between control action and the measurement of control action to permit the equipment to control the operation of more than one combustion zone.

It is therefore an object of our invention to provide apparatus for controlling operation of multiple combustion zones in which much or all of the control equipment is used to individually control each combustion zone without interfering with the operation of the control in the other combustion zone or zones.

Another object is to provide apparatus for controlling the relative flow of air and fuel to an open hearth furnace or other multiple combustion zone furnace.

Still another object is to provide such a control wherein the fuel flow is varied to maintain a desired excess $O_2$ and/or excess CO in the gases leaving the furnace.

A further object is to provide such a control in which there is a delay time between corrective action of the control and further operation of the control.

A still further object is to provide such a control in which the control is taken out of operation during reversal of the furnace and in which the setting of the control for operation of one side of the furnace is maintained at its last position before the furnace was reversed to fire from the opposite side.

These and other objects will be more apparent after referring to the following specification and attached drawings, in which:

The single figure is a schematic view of an open hearth furnace and the controls associated therewith.

Referring more particularly to the drawing reference numeral 2 indicates an open hearth furnace having regenerators 4 and 4W at opposite ends thereof. Uptakes 6 and 6W connect the regenerators 4 and 4W to furnace chamber 8. Air is delivered to regenerators 4 and 4W through conduit 10 from air fan 12. An orifice plate 14 is provided in the conduit 10 and air flow is measured by means of an air flow meter and indicator 16 connected across orifice plate 14. The regenerators 4 and 4W are also connected to a stack, not shown. The conduit 10 leads to a reversing valve 18 which controls selective flow of air to the regenerators and flow of waste gases to the stack. Burners 20 and 20W are arranged at opposite ends of the furnace above the uptakes 6 and 6W and waste gas probes 22 and 22W are arranged in the uptake 6 and 6W, respectively. Fuel from conduit 23 is supplied selectively to burners 20 and 20W through conduits 24 and 24W, respectively, a reversing valve 26 being provided for this purpose. The probes 22 and 22W are selectively connected to a gas pump and cleaner 28 through a reversing valve 29 and hence to a CO analyzer and recorder 30 and an oxygen analyzer and recorder 32. The parts so far described are standard equipment on many open hearth furnaces.

A fuel control valve 34 is located in the fuel supply conduit 23 on the entry side of reversing valve 26. Fuel flow to the furnace is metered by area meter body 36 and indicated on a recorder 38. The recorder 38 includes a pneumatic set point control 40 that operates an internal pneumatic controller 42 which in turn operates the valve 34 to maintain a constant fuel flow to the furnace. Air for the set point control 40 and pneumatic controller 42 is supplied through a conduit 44 through one of two parallel paths. A three-way solenoid operated valve 46 determines which parallel path is controlling. A manually operated valve 48 is used to control the flow through one path and a regulating valve 50 is used to control the flow through the other path. The position of the valve 50 is mechanically controlled by a servo-motor 52 which is part of a servo-unit 54. The servo-unit 54 includes a voltage amplifier 56 having one side connected to arm 58R of a slide wire resistor 58. The position of arm 58R is mechanically controlled by means of motor 52. A battery or other D.C. power source 60 is connected to the slide wire 58. The CO indicator 30 includes a re-transmitting slide wire 62 having its arm 62A movable with indicator arm 30A. Indicator 32 includes a re-transmitting slide wire 64 having its arm 64A movable with indicator arm 32A. A CO set point slide wire 66 and an $O_2$ set point slide wire 68 have their arms 66A and 68A connected in parallel with each other and with arms 62A and 64A. Resistors 70, 72, 74 and 76 are connected in series with arms 64A, 62A, 68A and 66A, respectively. The value of each resistor 70 and 74 is half that of each resistor 72 and 76. A battery or other D.C. power source 78 is connected across a slide wire 80. Arm 80A of slide wire 80 is mechanically connected to the pointer of air flow indicator 16. Resistors 82 and 84 of equal value are connected across the slide wire 80. A grounded lead wire 86 is connected to the negative side of battery 60 and also to slide wires 62, 64, 66 and 68. A lead wire 88 connects resistor 82 to slide wires 64 and 66 and a lead wire 90 connects resistor 84 to slide wires 62 and 68. The arms 62A, 64A, 66A and 68A are connected by lead 92 to amplifier 56. Lead wire 86 is also connected to slide wires 94 and 96 and to the negative side of a battery 98. The positive side of battery 98 is connected to the other side of slide wires 94 and 96. A resistor 100 is connected across wires 86 and 92. Arms 94A and 96A are mechanically connected to motor 52 and are electrically connected through capacitor 102 to lead 86 and through resistor 104 to lead 92. Electro mechanical clutches 106 and 108 are arranged in the connection between motor 52 and arms 94A and 96A, respectively. Solenoid 46S of three-way valve 46 is connected across A.C. power supply L1, L2, provided with a main switch 109, through a manually operable normally closed push button switch 110 and normally open push button switch 112. Relay coil 114 is connected in parallel with solenoid 46S and in series with switch 112. The relay 114 has a normally open contact 114C arranged in parallel with switch 112 and a normally open contact 114C1 arranged in parallel with time delay relay coil 116 which has a normally open contact 116C. The contact 116C is arranged in series with a timer 118 having a contact 118C. A second timer 120 is connected with timer 118 such that contact 118C will be cyclically closed for a certain interval determined by timer 118 and open for an interval determined by timer 120. The timers 118 and 120 may be any suitable conventional devices as for example "atcotrol" Dial Timers manufactured by Automatic Timing & Controls, Inc., King of Prussia, Pennsylvania, and described in their bulletin No. N-140, July 1959. A relay coil 122 having normally open contacts 122C and 122C1 is connected in series with a contact 124 which is so arranged in the reversing mechanism 125 that it will be open during reversal of the furnace and when the furnace is being fired through burner 20W and closed when the furnace is being fired through burner 20. A relay coil 126 having normally open contacts 126C and 126C1 is connected in series with a contact 128 which is so connected in the reversing mechanism that it is open during reversal of the furnace and during the time that the furnace is being fired through burner 20 and closed when the furnace is being fired through burner 20W. Contact 118C is connected in series with a relay coil 130 having a normally closed contact 130C in the connection from slide wire arms 94A and 95A to leads 86 and 92, a normally open contact 130C1 in line 92, and a normally open contact 130C2. Contact 122C1 is located in circuit between contact 130C and slide wire arm 94A, and contact 126C1 is located in circuit between contact 130C and slide wire arm 96A. Contact 130C2 is connected in series with contact 122C and solenoid 106S which controls the operation of clutch 106. Also, connected in series with contact 130C2 and in parallel with contact 122C and solenoid 106S are contact 126C and solenoid 108S which controls the operation of clutch 108. A switch 132, which is operated by the reversing mechanism, is open during furnace reversal and closed at all other times and controls the flow of current to relays 116, 122, 126 and 130 and timers 118 and 120.

To prepare the control for operation, the slide wire 80 is arranged so that a voltage is obtained which is proportional to total air flow in millions of standard cubic ft. per hour. Slide wires 62 and 64 are adjusted so that voltages proportional to actual percent $O_2$ and percent CO content are obtained. Slide wires 66 and 68 are set so that voltages proportional to the desired CO and $O_2$ content are obtained. Slide wires 94 and 96 are set so that a voltage will be obtained which is proportional to actual fuel flow. The time delay relay 116 and the timers 118 and 120 are set to obtain the desired delay and control action. To do this the time delay relay 116 is manually adjusted in the usual way so that its contact 116C will close a predetermined time after energization. The timers 118 and 120 are also manually adjusted in the usual way so that they will be "on" for given time intervals and "off" for given time intervals. The times selected for operation of the relay 116 and timers 118 and 120 are dependent upon the operational characteristics of the particular furnace and are determined by the operator or engineer after observing the operation of the furnace. For example, if the gas analyzer takes 90 seconds to stabilize after reversal the time delay relay 116 is set to close after 90 seconds. The timer 118 may be set at about 5 seconds "on" to allow the motor serval system 54 to adjust in response to a change in gas analysis. The timer 120 may be set at about 30 seconds "on" to allow the whole system to stabilize and to obtain a correct gas analysis after a change in fuel. This time may have to be adjusted periodically as conditions change. The timer 118 will be "off" for the time that timer 120 is "on" and timer 120 will be "off" for the time that timer 118 is "on."

To place the control on automatic, main switch 109 is closed to energize the system. Switch 110 is closed and remains closed while switch 112 is momentarily closed to energize solenoid 46S and relay coil 114. Energization of relay coil 114 closes its contacts 114C and 114C1. Closing of contact 114C locks solenoid 46S and relay coil 114 in. Closing of contact 114C1 energizes the time delay relay 116 through contact 132, which is closed except during reversal of the furnace. Energization of time delay relay 116 closes its contact 116C, thus energizing and starting timers 118 and 120 in operation. This causes contact 118C to close for a preset time interval determined by timer 118 and to open for a preset interval determined by timer 120. Assuming that the furnace is firing from the east side, fuel will pass through reversing valve 26 and conduit 24 to the burner 20 and air will pass through reversing valve 18 to regenerator 4. The burnt gases pass through downtake 6W and a sample will be picked up by sampling tube 22W and pass through reversing valve 29 through gas pump and cleaner 28 to the CO analyzer and recorder 30 and to the oxygen analyzer and recorder 32. Assuming that there is a change in the CO and $O_2$ contents, the arms 62A and 64A will be moved to a new setting on slide wires 62 and 64 so as to obtain a voltage proportional to the actual CO and $O_2$.

Since the firing is from the east side switch 124 will be closed, thus energizing relay coil 122 and closing its contacts 122C and 122C1. Closing of contact 122C1 connects the slide wire 94 through contact 130C to resistor 100 and capacitor 102. This causes a voltage to build up in capacitor 102 equal to that across slide wire 94. At this time the voltage across slide wire 58 will also be equal to the voltage across capacitor 102. Then, when contact 118C closes, relay coil 130 will be energized to open its contact 130C and close its contacts 130C1 and 130C2. Opening of contact 130C disconnects slide wire arm 94A from resistor 100 and capacitor 102. Closing of contact 130C1 applies the summed up voltages from slide wires 62, 64, 66 and 68 as modified by the voltage from slide wire 80 across resistor 100 and closing of contact 130C2 energizes solenoid 106S to close clutch 106 thus connecting slide wire arm 94A to motor 52. The voltage across slide wire 80 is proportional to the value 34$a$ of Equation I and the modified voltage on wire 92 is proportional to the value of $f-fo$. If there has been no change in the CO or $O_2$ content of the flue gas the modified voltage on wire 92 will be zero and the voltage stored by capacitor 102 will be equal to the voltage across slide wire 58 so that the setting of slide wire 94 will remain as is. However, if there has been a change in the oxygen and/or carbon monoxide content of the flue gas the modified voltage on wire 92 will not be zero and the voltage across resistor 100 will not be the same as that across slide wire 58 and motor 52 will operate through clutch 106 to move slide wire arm 94A to a new position and at the same time will open or close valve 50 a corresponding amount. When the voltage across resistor 100 is in balance with that of slide wire 58, motor 52 will come to a stop. Change in position of valve 50 will cause a corresponding change in the position of valve 34 to increase or decrease the fuel flow as required. After a predetermined set time contact 118C will open, thus deenergizing relay coil 130 and disengaging clutch 106. This time is selected to permit the changed fuel flow to be reflected in the flue gas analyzed by analyzers 30 and 32 before the control continues operation. In case two combustion zones are operating at the same time the control will be connected to control the second combustion zone during this time. The control is then back in its original position except for the position of arm 94A. The above operations are repeated until the furnace is reversed. When the furnace is reversed, switch 132 will open thus deenergizing coils 122 and 130. After reversal contact 128 will close, thus energizing relay coil 126 and closing its contacts 126C and 126C1. Because contact 122C is open at this time, clutch 106 will be disengaged and the previous setting on slide wire 94 will remain until the next reversal of the furnace. Closing of contact 126C1 will impress the voltage from slide wire 96 through closed contact 130C upon resistor 100 and capacitor 102. This causes a voltage to build up in capacitor 102 equal to that across slide wire 96. Then, assuming that the flue gas sample has been analyzed and contact 118C has closed, the voltage on wire 92 will be impressed across resistor 100 and clutch 108 will engage. The operation is then as described above in discussing the firing from the east side of the furnace. Assuming that there has been a change in the carbon monoxide and/or oxygen content of the flue gas the voltage on wire 92 will not be zero so that controller 54 will not be in balance, thus causing operation of motor 52 to move slide wire arm 96A and vary the position of valve 50. Thus a new setting of slide wire 96 is obtained and the fuel rate is changed. Opening of contact 118C after the predetermined time interval will deenergize coil 130 so as to bring the system back to its original position except for the new setting of slide wire 96. This operation continues until it is time to reverse the furnace at which time switch 132 will open, thus deenergizing coils 122, 126 and 130. Assuming that the flue gas analysis has changed during the operation of the furnace from the west side it will be clear that the setting of slide wire 94 will not be the same as that of slide wire 96. The operation will then be repeated as set forth above. Since it is quite common for the fuel requirements and combustion characteristics when firing from one end of the furnace to vary from those at the other end of the furnace, maintaining the slide wire 94 in its last adjusted position while the furnace is operating from the other end results in less hunting to bring the furnace into the desired operating conditions immediately after reversal.

While the equipment has been described as operating on changes in both carbon monoxide and oxygen it may also operate on changes in only one of these components. Also, while the equipment will operate more accurately and more satisfactorily when the fuel rate is changed, it is possible to control the flow of air rather than the flow of fuel by connecting the slide wire arm 80A to the fuel flow meter and connecting valve 34, meter 36 and associated equipment in the air conduit 10. The polarities of slide wires 62, 64, 66, 68 and 80 should also be reversed in this case.

While one embodiment of our invention has been shown and described, it will be apparent that other adaptations and modifications may be made without departing from the scope of the following claims.

We claim:

1. Apparatus comprising means forming at least two combustion zones, a burner for each combustion zone, means for controlling flow of combustion component air to said burners, means for controlling flow of combustion component fuel to said burners, means for controlling the rate of flow of one of said combustion components, a flue gas analyzer, means for selectively delivering samples of flue gases to said analyzer from each of said combustion zones having an operating burner, means for obtaining a voltage proportional to a pre-selected component of said flue gas, said component varying with the ratio of fuel and air flow, means for obtaining a voltage proportional to a preset desired percentage of said pre-selected component in said flue gas, means for connecting said voltages in opposition to one another so as to obtain a voltage difference, means for obtaining a voltage proportional to the flow of one of said combustion components to said operating burner, means for multiplying said last named voltage and said voltage difference to obtain a first signal, means for obtaining a voltage proportional to the flow of the other of said combustion components to said operating burner to obtain a second signal, means for comparing said signals, means operable by said comparing means for changing the ratio between fuel and air flow to bring the preselected component of said flue gas to the desired percentage, means for obtaining a voltage proportional to the flow of the said other of said combustion components to a burner in a second combustion zone to obtain a third signal, and means for disconnecting the comparing means from said second signal and preventing resetting thereof and connecting the comparing means to said third signal when the flue gas delivering means is actuated to deliver flue gas from said second combustion zone to said analyzer.

2. Apparatus according to claim 1 in which air is the said one of said combustion components and fuel is the said other of said combustion components.

3. An open hearth furnace and control comprising a regenerator at each end of said furnace, a burner at each end of said furnace, means for controlling flow of combustion component air to said regenerators, means for controlling flow of combustion component fuel to each burner, means for controlling rate of flow of one of said combustion components, means for reversing the direction of flow of fuel to said furnace, the direction of flow of air to said regenerators and the direction of flow of waste gases from said furnace, a flue gas analyzer, means for selectively delivering samples of flue gases from the end of said furnace opposite the operating burner to said analyzer, means for obtaining a voltage proportional to a preselected component of said flue gas, said component varying with the ratio of fuel and air flow, means for obtaining a voltage proportional to a preset desired percentage of said preselected component in said flue gas, means for connecting said voltages in opposition to one another so as to obtain a voltage difference, means for obtaining a voltage proportional to the flow of one of said combustion components to said furnace, means for multiplying said last named voltage and said voltage difference to obtain a first signal, means for obtaining a voltage proportional to the flow of the other of said combustion components to one end of the furnace to obtain a second signal, means for comparing said signals, means operable by said comparing means for changing the ratio between fuel and air flow to bring the preselected component of said flue gas to the desired percentage, means for obtaining a voltage proportional to the flow of the said other fuel component to the second end of the furnace to obtain a third signal, and means for disconnecting the comparing means from said second signal and preventing resetting thereof and connecting the comparing means to said third signal when the flue gas delivering means is actuated to deliver flue gas from said one end of the furnace.

4. Apparatus according to claim 3 including means for periodically disconnecting the first signal from said comparing means.

5. Apparatus according to claim 4 including means for preventing operation of said comparing means and the said means operable by said comparing means during reversal of said furnace.

6. An open hearth furnace and control comprising a regenerator at ecah end of said burner, a burner at each end of said burner, means for selectively delivering air to said regenerators, means for controlling rate of flow of fuel to each burner, means for reversing the direction of flow of fuel to said furnace, the direction of flow of air to said regenerators and the direction of flow of waste gases from said furnace, an oxygen analyzer, a carbon monoxide analyzer, means for selectively delivering samples of flue gases from the end of said furnace opposite the operating burner to said oxygen and carbon monoxide analyzers, means for obtaining a voltage proportional to the oxygen content of said flue gas, means for obtaining a voltage proportional to the carbon monoxide content of said flue gas, means for obtaining a voltage proportional to a preset desired oxygen content of said flue gas, means for obtaining a voltage proportional to a preset desired carbon monoxide content of said flue gas, means for adding the oxygen content voltage to the preset carbon monoxide voltage and subtracting the oxygen preset voltage and carbon monoxide content voltage therefrom so as to obtain a summation voltage, means for obtaining a voltage proportional to the air flow to said furnace, means for multiplying said last named voltage and said voltage difference to obtain a first signal, means for obtaining a voltage proportional to fuel flow to one end of the furnace to obtain a second signal, means for comparing said signals, means operable by said comparing means for changing the ratio between fuel and air flow to bring the oxygen and carbon monoxide content of said flue gas to the desired percentages, means for obtaining a voltage proportional to fuel flow to the other end of the furnace to obtain a third signal, and means for disconnecting the comparing means from said second signal and preventing resetting thereof and connecting the comparing means to said third signal when the flue gas delivering means is actuated to deliver flue gas from said one end of the furnace.

7. Apparatus according to claim 6 including means for periodically disconnecting the first signal from said comparing means.

8. Apparatus according to claim 7 including means preventing operation of said comparing means and the said means operable by said comparing means during reversal of said furnace.

References Cited in the file of this patent

UNITED STATES PATENTS

| 2,540,966 | Swain | Feb. 6, 1951 |
| 2,607,576 | Harter | Aug. 19, 1952 |
| 2,608,351 | Smoot | Aug. 26, 1952 |
| 2,760,508 | Dickey | Aug. 28, 1956 |

OTHER REFERENCES

Hubbell: Iron and Steel Engineer, August 1953, pages 53–58.

UNITED STATES PATENT OFFICE
CERTIFICATE OF CORRECTION

Patent No. 3,132,802                               May 12, 1964

George Dykeman et al.

It is hereby certified that error appears in the above numbered patent requiring correction and that the said Letters Patent should read as corrected below.

Column 4, line 8, for "95A" read -- 96A --; column 7, line 39, for "ecah" read -- each --; same line 39, for "burner", first occurrence, read -- furnace --; line 40, for "burner" read -- furnace --.

Signed and sealed this 15th day of September 1964.

(SEAL)
Attest:

ERNEST W. SWIDER                             EDWARD J. BRENNER
Attesting Officer                               Commissioner of Patents